United States Patent
Nishimura et al.

[11] Patent Number: 5,995,300
[45] Date of Patent: Nov. 30, 1999

[54] ZOOM LENS BARREL HAVING FLANGE BACK ADJUSTMENT MECHANISM

[75] Inventors: Syunji Nishimura; Takashi Suzuki, both of Saitama-ken, Japan

[73] Assignee: Fuji Photo Optical Co., Ltd., Saitama-ken, Japan

[21] Appl. No.: 09/133,328

[22] Filed: Aug. 13, 1998

[30] Foreign Application Priority Data

Aug. 13, 1997 [JP] Japan .................................. 9-218583

[51] Int. Cl.⁶ .................................................. G02B 15/14
[52] U.S. Cl. .......................................................... 359/699
[58] Field of Search .................................. 359/699, 700, 359/701, 704, 705, 706, 823

[56] References Cited

U.S. PATENT DOCUMENTS 5,687,029   11/1997   Omi et al. ................................ 359/700

FOREIGN PATENT DOCUMENTS

7-134235   5/1995   Japan .

*Primary Examiner*—Georgia Epps
*Assistant Examiner*—Ricky Mack
*Attorney, Agent, or Firm*—Sixbey, Friedman, Leedom & Ferguson; Donald R. Studebaker

[57] ABSTRACT

A zoom lens barrel includes first and second lens groups arranged along an optical axis. A first drive mechanism moves the first lens group only in the direction of the optical axis for focusing. A second drive mechanism moves both the first and second lens groups in the direction of the optical axis for zooming. A rotary barrel which is rotated by the second drive mechanism is provided with a cam groove which guides the second lens group in response to rotation of the rotary lens barrel during zooming. A cam follower is provided on the lens holder of the second lens group and is in engagement with the cam groove. The cam groove consists of alternately formed zooming groove portions and flange back adjustment groove portions, and flange back adjustment is carried out by rotating the rotary barrel with the cam follower in engagement with one of the flange back adjustment groove portions.

7 Claims, 6 Drawing Sheets

ZOOM LENS BARREL HAVING FLANGE BACK ADJUSTMENT MECHANISM

BACKGROUND OF THE INVENTION

1. Field of the Invention

This invention relates to a zoom lens barrel, and more particularly to a zoom lens barrel in which flange back adjustment can be easily carried out by use of a simple mechanism.

2. Description of the Related Art

When manufacturing a photographic camera with a zoom lens, flange back adjustment is carried out for correcting deviation of a focal point due to fluctuation in lens properties, precision in a lens drive cam and the like, thereby positioning the focal point of the zoom lens on the film surface.

As a method of carrying out the flange back adjustment, there has been proposed a method in which a fixed barrel is linearly moved back and forth by rotating a rotary barrel to move the overall lens groups in the direction of optical axis, as disclosed for instance in Japanese Unexamined Patent Publication No. 7(1995)-134235.

However this approach is disadvantageous in that a rotary barrel which is used only for the flange back adjustment is provided and adds to the overall size of the barrel.

In the case of a camera with a zoom lens which comprises a front lens group and a rear lens group disposed along the optical axis and in which both the front and rear lens groups are moved in the direction of the optical axis for zooming and only the front lens group is moved in the direction of the optical axis by an actuator provided in a shutter block for focusing, it is conceivable that the front lens group is moved in the direction of the optical axis by the actuator during each focusing by a distance which can compensate for deviation of the focal point. However this approach is disadvantageous in that the movement of the actuator must be enlarged, which adds to the cost of the shutter block.

SUMMARY OF THE INVENTION

In view of the foregoing observations and description, the primary object of the present invention is to provide a zoom lens barrel which makes it feasible to easily carry out flange back adjustment without increasing the overall size of the barrel and enlarging the movement of the actuator for focusing.

In accordance with the present invention, there is provided a zoom lens barrel comprising first and second lens groups arranged along an optical axis, a first drive means which moves the first lens group only in the direction of the optical axis for focusing, a second drive means which moves both the first and second lens groups in the direction of the optical axis for zooming, a rotary barrel which is rotated by the second drive means, a cam groove which is formed on the rotary barrel and guides the second lens group in response to rotation of the rotary lens barrel during zooming, and a cam follower which is provided on the lens holder of the second lens group and is in engagement with the cam groove, wherein the improvement comprises that said cam groove consists of alternately formed zooming groove portions and flange back adjustment groove portions, and flange back adjustment is carried out by rotating the rotary barrel with the cam follower in engagement with one of the flange back adjustment groove portions.

Preferably there is provided a movable barrel which is disposed inside the rotary barrel in a helicoidal engagement with the rotary barrel to be projected forward from the front end of the rotary barrel and to be retracted into the rotary barrel in the direction of the optical axis in response to rotation of the rotary barrel, and the first lens group is held by the movable barrel and forms a front lens group while the second lens group forms a rear lens group disposed rearward of the front lens group.

In one embodiment of the present invention, the rotary barrel is in the form of an inner intermediate barrel disposed inside an outer intermediate barrel which is disposed inside a fixed barrel in a helicoidal engagement with the fixed barrel and is moved in the direction of the optical axis rotated by the second drive means, the inner intermediate barrel being in a helicoidal engagement with the outer intermediate barrel and being moved in the direction of the optical axis while rotating when torque of the outer intermediate barrel is transmitted thereto through a gear system.

In the zoom lens barrel of the present invention, the position of the cam follower in each of the flange back adjustment groove portions at the time the flange back adjustment is carried out during manufacture of the camera is stored, and the rotary barrel is rotated to bring the cam follower to the stored position in each flange back adjustment groove portion prior to focusing.

Since the flange back adjustment can be carried out by simply providing the rotary barrel with a cam groove consisting of alternately formed zooming groove portions and flange back adjustment groove portions, the zoom lens barrel of the present invention can be small in the number of components and can be small in size though provided with a mechanism for the flange back adjustment, which contributes to miniaturizing the camera and reduction in the cost of the camera.

Further in the zoom lens barrel of the present invention, since the flange back adjustment can be carried out prior to focusing each time the zoom lens is focused, the distance by which the first lens group is to be moved for focusing may be small, which also contributes to reduction in the cost of the camera, and at the same time since tracking can be carried out at all the zooming positions, focusing accuracy can be improved.

DESCRIPTION OF THE PREFERRED EMBODIMENT

Figure 1:
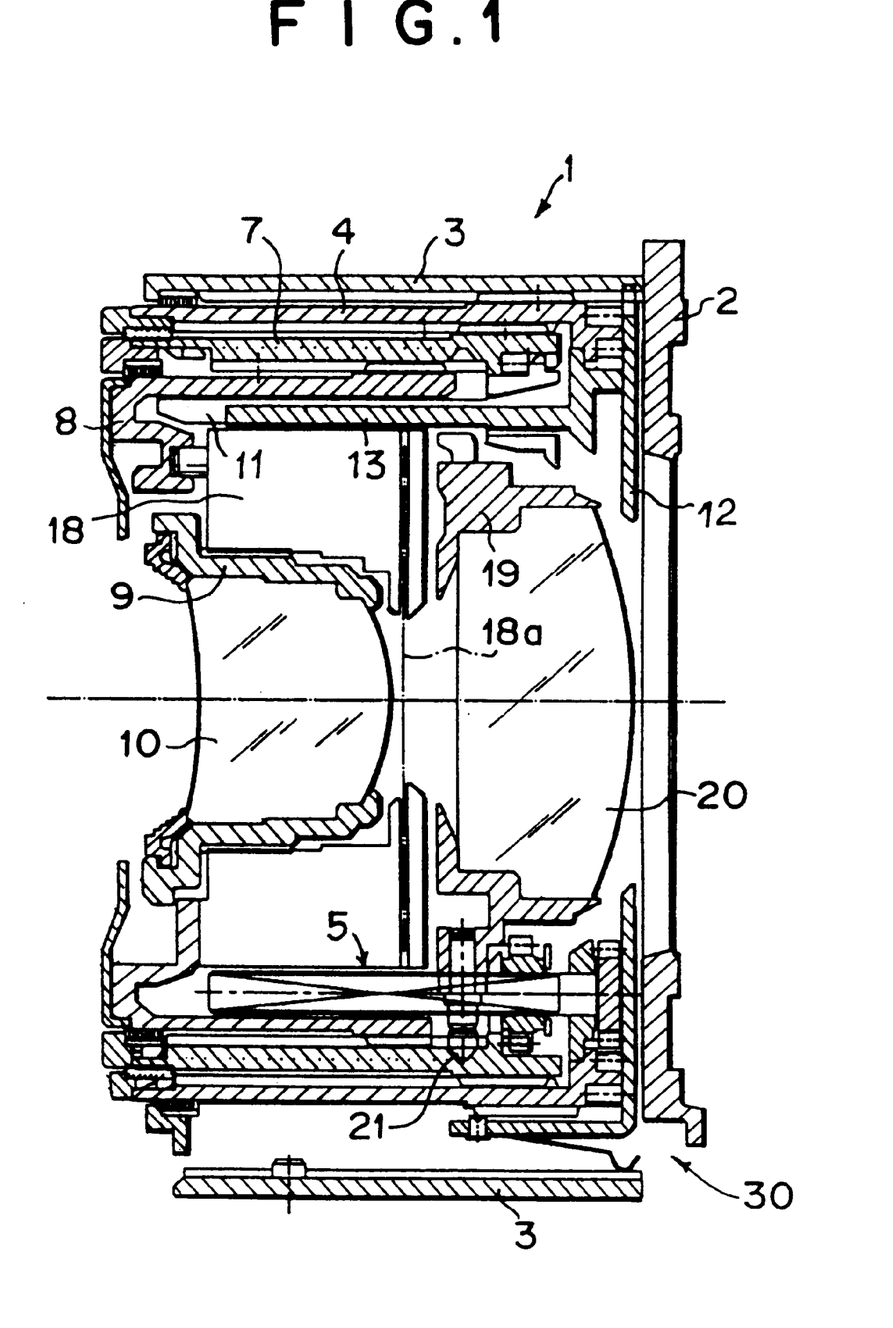
FIG. 1 is a cross-sectional view of a zoom lens barrel in a retracted position in accordance with an embodiment of the present invention.
Figure 2:
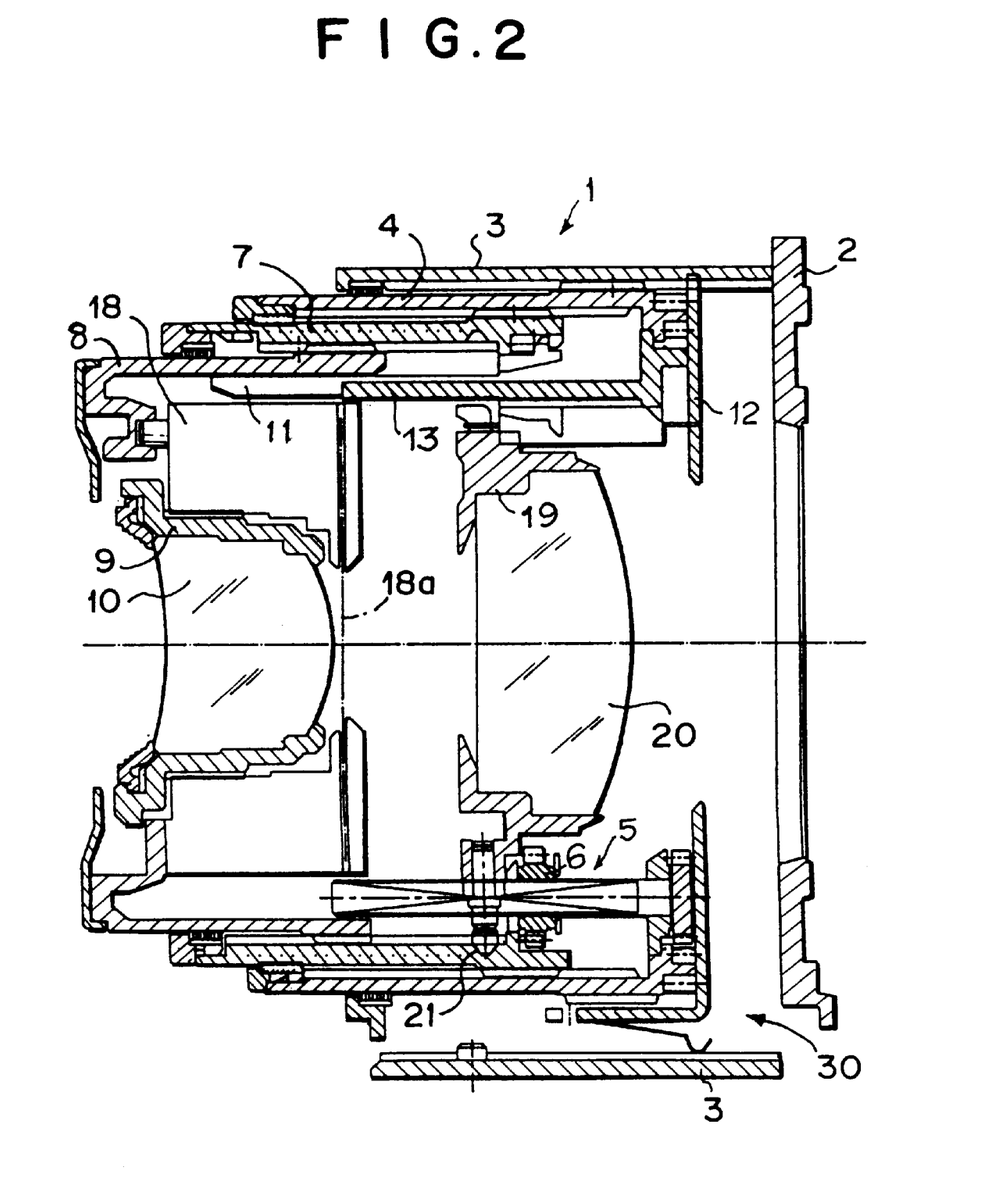
FIG. 2 is a cross-sectional view of the zoom lens barrel in a wide-angle position.
Figure 3:
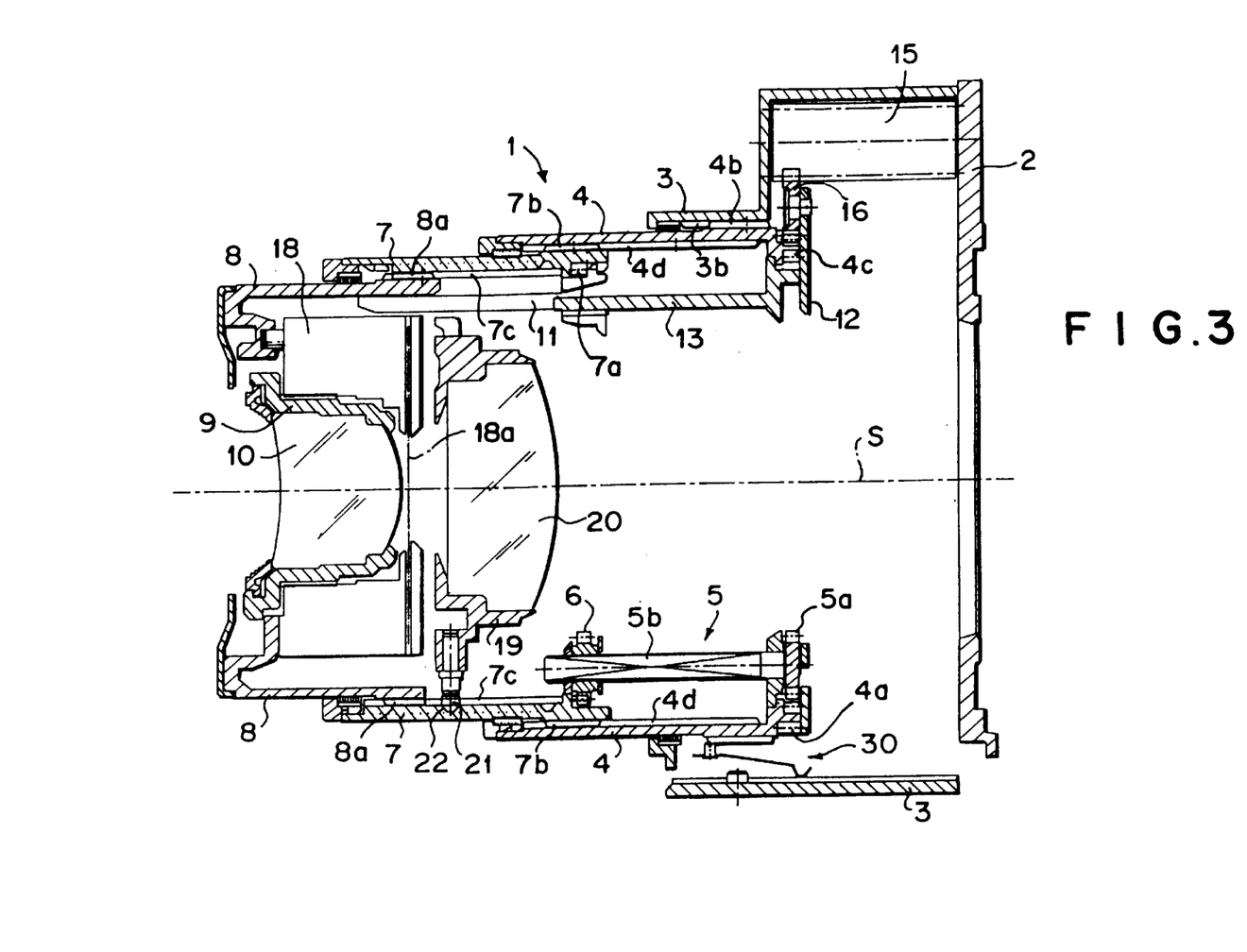
FIG. 3 is a cross-sectional view of the zoom lens barrel in a tele-position.

A zoom lens barrel in accordance with an embodiment of the present invention will be described with reference to the drawings. FIGS. 1 to 3 are cross-sectional views along a vertical plane including the optical axis. The drive mechanism of the outer intermediate barrel is abbreviated in FIGS. 1. and 2. In FIGS. 1 and 2, some mechanisms are overlapped.

The zoom lens barrel 1 of this embodiment comprises a fixed barrel 3 fixed to a camera body 2 and an outer intermediate barrel 4 which is coaxially disposed inside the fixed barrel 3 in a helicoidal engagement with the fixed barrel 3. The outer intermediate barrel 4 can be projected forward from the front end of the fixed barrel 3 and retracted into the fixed barrel 3 in the direction of the optical axis S when it is rotated. An inner intermediate barrel 7 is coaxially disposed inside the outer intermediate barrel 4 in a helicoidal engagement with the outer intermediate barrel 4. The inner intermediate barrel 7 moves in the direction of the optical axis S while rotating when torque of the outer intermediate barrel 4 is transmitted to the inner intermediate barrel 7 through a gear shaft 5 and a slide gear 6. A movable barrel 8 is coaxially disposed inside the inner intermediate barrel 7 in a helicoidal engagement with the inner intermediate barrel 7. The movable barrel 8 can be projected forward from the front end of the inner intermediate barrel 7 and retracted into the inner intermediate barrel 7 in the direction of the optical axis S in response to rotation of the inner intermediate barrel 7. A straight travel barrel 11 is coaxially disposed inside the movable barrel 8. A front lens group 10 held by a lens holder 9 is supported on the front end portion of the movable barrel 8.

A key plate 12 is provided on the rear side of the outer intermediate barrel 4. The key plate 12 is in engagement with a groove (not shown), formed on the inner surface of the fixed barrel 3 to extend in the direction of the optical axis S, so that it is slid in response to movement of the outer intermediate barrel 4 in the direction of the optical axis S though cannot be rotated. A straight travel key 13 is fixed to the key plate 12 and the rear end portion of the outer intermediate barrel 4 is supported for rotation between the key plate 12 and the straight travel key 13. The straight travel key 13 is engaged with the straight travel barrel 11 to be slidable in the direction of the optical axis S relatively to the straight travel barrel 11. The movable barrel 8 is engaged with the straight travel barrel 11 to be slidable in the direction of the optical axis S relatively to the straight travel barrel 11 and rotation of the movable barrel 8 relative to the straight travel barrel 11 is limited. With this arrangement, the moldable barrel 8 is moved straight in response to rotation of the inner intermediate barrel 7.

Figure 4:
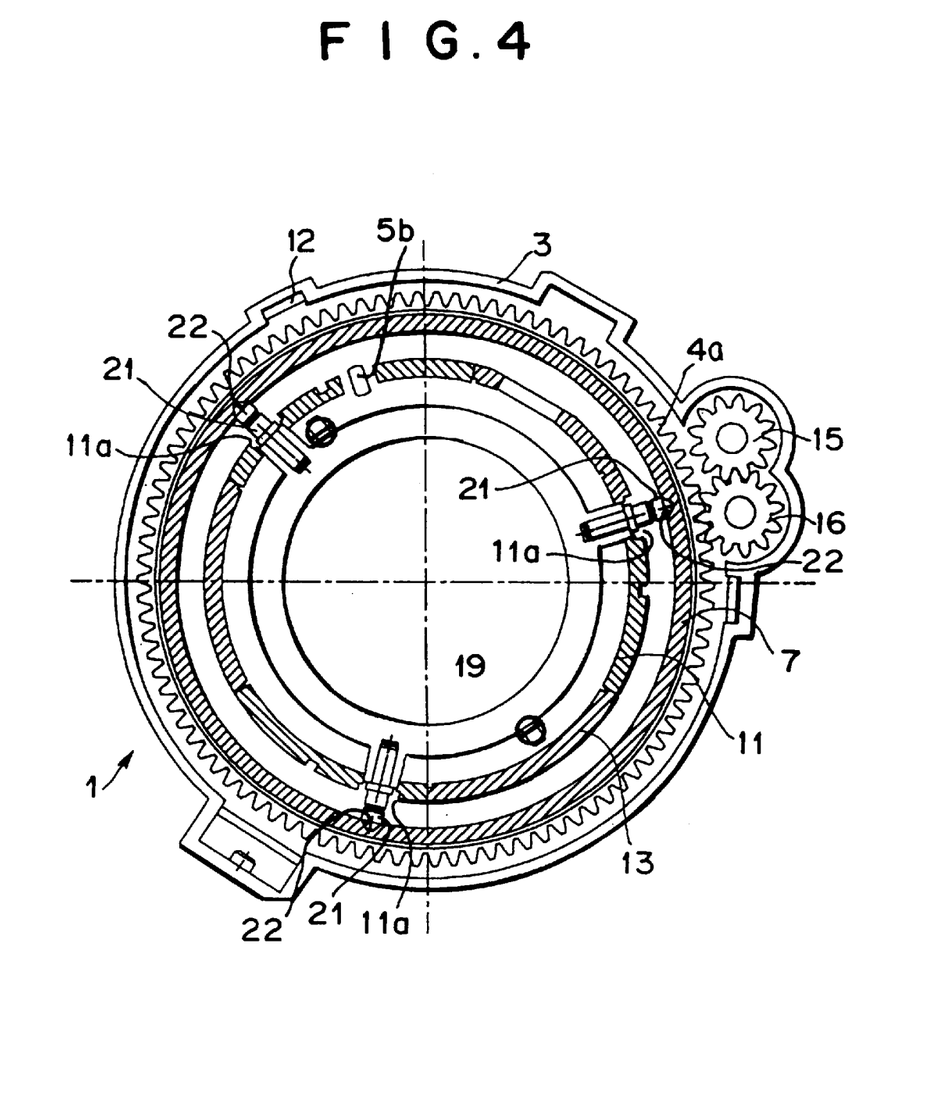
FIG. 4 is a cross-sectional view showing the drive mechanism of the outer intermediate barrel and the support structure for the rear lens group.

As shown in FIGS. 3 and 4, a long gear 15 having a long tooth face and driven by an electric motor (not shown) is mounted for rotation on the outer side of the fixed barrel 3. A gear portion 4a is formed on the outer circumferential surface of the outer intermediate barrel 4 at a rear end portion thereof. An idle gear (slide gear) 16 mounted for rotation on the key plate 12 is in mesh with the long gear 15 and the gear portion 4a. With this arrangement, the outer intermediate barrel 4 is rotated by the motor and the zoom lens barrel 1 is zoomed in response to rotation of the outer intermediate barrel 4.

Specifically, as shown in FIG. 3, a helicoid 4b is formed on the outer surface of the outer intermediate barrel 4 at a rear end portion thereof and is in mesh with an inner helicoid 3b formed on the inner surface of the fixed barrel 3, whereby the outer intermediate barrel 4 is moved back and forth in the direction of the optical axis S while rotating relatively to the fixed barrel 3 when torque is transmitted to the outer intermediate barrel 4 from the long gear 15 through the idle gear 16.

A gear portion 4c is formed on the inner circumferential surface of the outer intermediate barrel 4 at a rear end portion thereof. The gear shaft 5 is supported for rotation on the rear end of the straight travel key 13 to extend in the direction of the optical axis S and a gear portion 5a is integrally formed on the rear end of the gear shaft 5 and is in mesh with the gear portion 4c on the outer intermediate barrel 4. The slide gear 6 is slidably fitted on a shaft portion 5b of the gear shaft 5 which is rectangular in cross-section as shown in FIG. 4. The slide gear 6 which is an idle gear is in mesh with a gear portion 7a formed on the inner circumferential surface of the inner intermediate barrel 7 at a rear end portion thereof and is moved in the direction of the optical axis S together with the inner intermediate barrel 7. A helicoid 7b is formed on the outer circumferential surface of the inner intermediate barrel 7 at a rear end portion thereof and is in mesh with an inner helicoid 4d formed on the inner circumferential surface of the outer intermediate barrel 4.

With this arrangement, torque of the outer intermediate barrel 4 is transmitted to the inner intermediate barrel 7 through the gear shaft 5 and the slide gear 6, whereby the inner intermediate barrel 7 is moved back and forth in the direction of the optical axis S while rotating.

A helicoid 8a is formed on the outer circumferential surface of the movable barrel 8 and in mesh with a helicoid 7c formed on the inner circumferential surface of the inner intermediate barrel 7, whereby the movable barrel 8 is moved straight in the direction of the optical axis S under the guidance of the straight travel barrel 11 in response to rotation of the inner intermediate barrel 7.

A shutter block 18 is fixed to the front end portion of the movable barrel 8 and the front lens holder 9 for the front lens group is in a helicoidal engagement with the shutter block 18. The shutter block 18 is provided with an actuator for driving shutter blades 18a and an actuator (first drive means) for rotating the front lens holder 9 for focusing, and focusing at each focal length is carried out by movement of only the front lens group 10 by the first drive means.

A rear lens holder 19 for holding a rear lens group 20 is disposed behind the front lens group 10. Three cam follower pins 21 extend radially outward from the outer circumferential surface of the rear lens holder 19 at substantially regular intervals as shown in FIG. 4.

Figure 5:
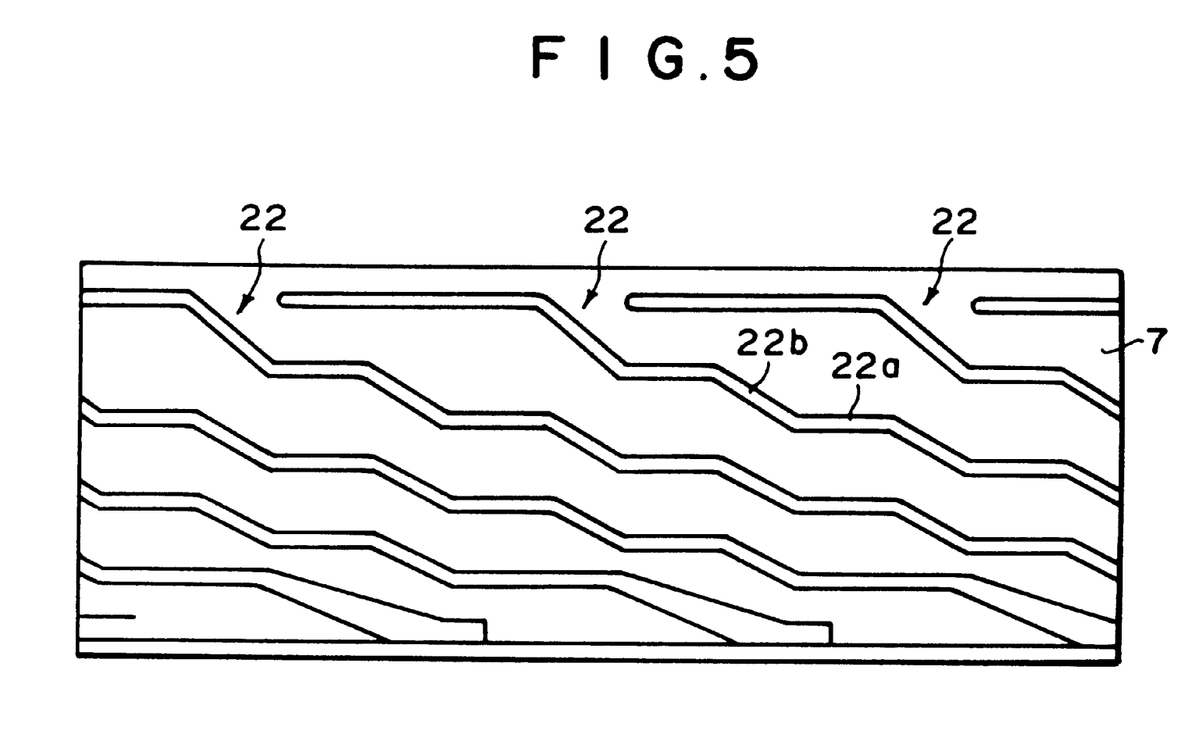
FIG. 5 is a development showing an example of the cam groove on the inner intermediate barrel.

As shown in FIG. 5, three cam grooves 22 are formed on the inner surface of the inner intermediate barrel 7. Each of the cam grooves 22 comprises a plurality of horizontal portions 22a and a plurality of inclined portions 22b which are alternately formed and the cam grooves 22 are in the same phase in the circumferential direction of the inner intermediate barrel 7. The cam follower pins 21 extend through guide grooves 11a, formed in the straight travel barrel 11 to extending in the direction of the optical axis S, into engagement with the respective cam grooves 22. Each of the horizontal portions 22a of each cam groove 22 extends substantially in parallel to the direction of rotation of the inner intermediate barrel 7 and forms a flange back adjustment groove portion. Each of the inclined portions 22b is inclined at a predetermined angle to the direction of rotation of the inner intermediate barrel 7 and forms a zooming groove portion. When the cam follower pin 21 is in the flange back adjustment groove portion 22a, rotation of the inner intermediate barrel 7 causes only the front lens group 10 to move relatively to the inner intermediate barrel 7 with the rear leans group 20 kept substantially stationary, whereby the flange back adjustment is carried out.

In this particular embodiment, the focal length of the lens is changed in seven steps (step zoom) while the inner intermediate barrel 7 is rotated by a predetermined angle between the wide-angled position shown in FIG. 2 and the tele-position shown in FIG. 3. In each flange back adjustment groove portion 22a, the long gear 15 (second drive means) is driven by the motor and the inner intermediate barrel 7 is rotated by a small angle by way of the idle gear 16 and the outer intermediate barrel 4, whereby the movable barrel 8 is moved in the direction of the optical axis S by a small distance and the front lens group 10 is moved. Thus the flange back adjustment is carried out. Thereafter, the actuator (the first drive means) in the shutter block 18 moves only the front lens group 10 in the direction of the optical axis S. Thus focusing is effected.

When the cam follower pin 21 is in each of the zooming groove portion 22b, rotation of the long gear 15 by the motor causes both the front lens group 10 and the rear lens group 20 to move in the direction of the optical axis S relatively to the inner intermediate barrel 7 with relative position between the lens groups held unchanged. Thus zooming is effected.

The flange back adjustment will be described in more detail hereinbelow.

As shown in FIGS. 1 to 3, an encoder 30 which detects the focal length by detecting the position of the key plate 12 which is moved straight in the direction of the optical axis S in response to rotation of the outer intermediate barrel 4 is provided between the inner surface of the fixed barrel 3 and the key plate 12. The angle of rotation of the drive motor corresponding to the angle of rotation of the inner intermediate barrel 7 can be detected from the camera side through the output of the encoder 30.

Figure 6:
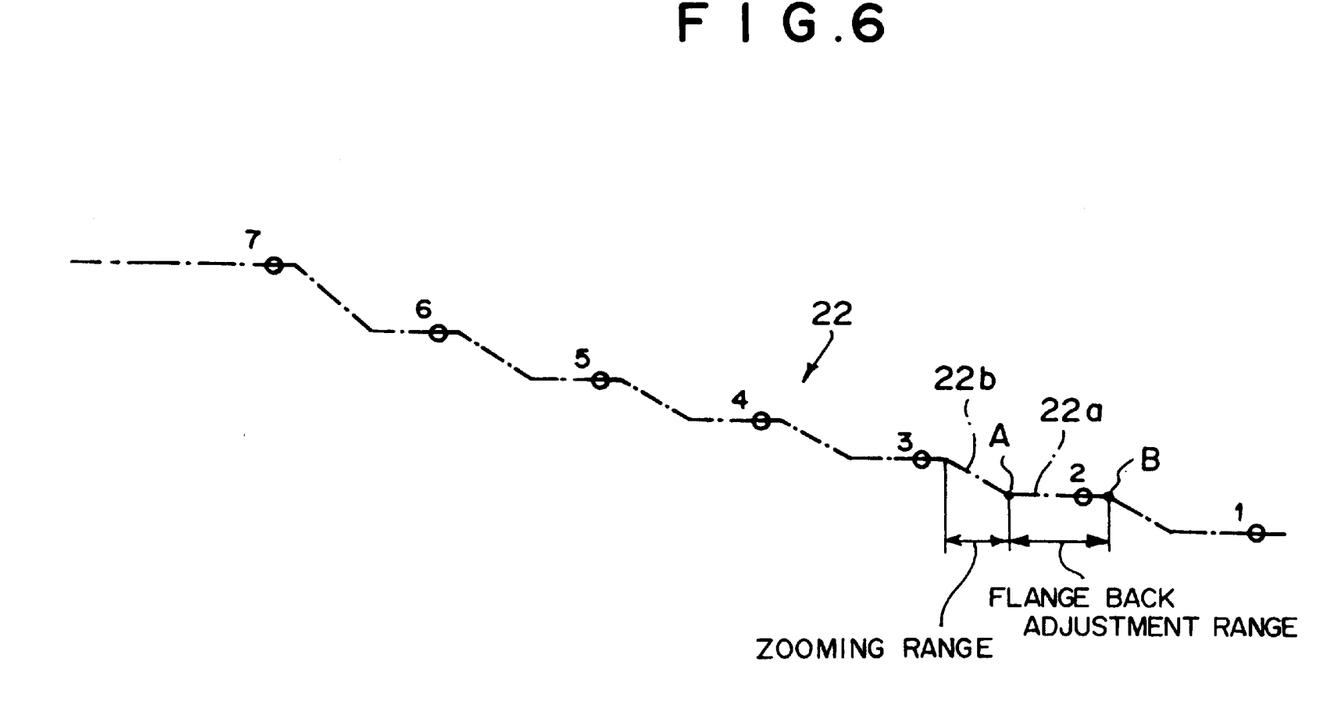
FIG. 6 is a view for illustrating the method of flange back adjustment.

During manufacture of the camera, the flange back adjustment is carried out at each focal length by driving the motor to move the front lens group 10 in the direction of the optical axis S with each cam follower pin 21 in engagement with each flange back adjustment groove portion 22a of the cam groove 22. At this time, as shown in FIG. 6, the number of pulses $P_A$ output from the encoder 30 when the inner intermediate barrel 7 is rotated to move the cam follower pin 21 from one end A of each flange back adjustment groove portion 22a to a position (denoted by numerals 1 to 7 in FIG. 6) where the focal point is on the film surface (will be referred to as "nadjusted points" hereinbelow) is stored in a memory in the camera body. At the same time, the number of pulses $P_B$ output from the encoder 30 when the inner intermediate barrel 7 is rotated in the reverse direction to move the cam follower pin 21 from the other end B of each flange back adjustment groove portion 22a to the adjusted point where the focal point is on the film surface is also stored in the memory.

When photographing, the motor is driven for zooming and when the cam follower pin 21 is brought to the end A or B of the flange back adjustment groove portion 22a corresponding to a desired focal length, the motor is once stopped. Then a control circuit reads out the number of the pulses $P_A$ or $P_B$ (from the end A to the adjusted point or from the end B to the adjusted point for the flange back adjustment groove portion 22a) from the memory and drives the motor by an angle corresponding to the number of pulses, thereby bringing the cam follower pin 21 to the adjusted point. When the cam follower pin 21 is brought to the adjusted point, the motor is stopped and focusing is effected by moving the front lens group 10 in the direction of the optical axis A by the actuator of the shutter block 18.

As can be understood from the description above, in the embodiment described above, since the flange back adjustment can be carried out by simply providing the inner intermediate barrel 7 with a cam groove 22 consisting of alternately formed zooming groove portions 22b and flange back adjustment groove portions 22a, the zoom lens barrel 1 can be small in the number of components and can be small in size and movement of the actuator in the shutter block 18 may be small, which contributes to miniaturizing the camera and reduction in the cost of the camera.

Further in the zoom lens barrel of this embodiment, by storing the position of the cam follower pin 21 in each flange back adjustment groove portion 22a during flange back adjustment in the manufacturing process and rotating the inner intermediate barrel 7 to bring the cam follower pin 21 to the stored adjusted point prior to focusing, tracking can be carried out at all the zooming positions, whereby focusing accuracy can be improved.

What is claimed is:

1. A zoom lens barrel comprising first and second lens groups arranged along an optical axis, a first drive means which moves the first lens group in the direction of the optical axis for focusing, a second drive means which moves both the first and second lens groups in the direction of the optical axis for zooming, a rotary barrel which is rotated by the second drive means, a cam groove which is formed on the rotary barrel and guides the second lens group in response to rotation of the rotary lens barrel during zooming, and a cam follower which is provided on the lens holder of the second lens group and is in engagement with the cam groove, wherein the improvement comprises that said cam groove consists of alternately formed zooming groove portions and flange back adjustment groove portions, and flange back adjustment is carried out by rotating the rotary barrel with the cam follower in engagement with one of the flange back adjustment groove portions.

2. A zoom lens barrel as defined in claim 1 further comprising a movable barreal disposed inside the rotary barrel in a helicoidal engagement with the rotary barrel to be projectable forward from the front end of the rotary barrel and retractable into the rotary barrel in the direction of the optical axis in response to rotation of the rotary barrel, and wherein the first lens group is held by the movable barrel and forms a front lens group while the second lens group forms a rear lens group disposed rearward of the front lens group.

3. A zoom lens barrel as defined in claim 2 in which the rotary barrel is in the form of an inner intermediate barrel disposed inside an outer intermediate barrel which is disposed inside a fixed barrel in a helicoidal engagement with the fixed barrel and is moved in the direction of the optical axis rotated by the second drive means, the inner intermediate barrel being in a helicoidal engagement with the outer intermediate barrel and being moved in the direction of the optical axis while rotating when torque of the outer intermediate barrel is transmitted thereto through a gear system.

4. A zoom lens barrel as defined in claim 1 in which the position of the cam follower in each flange back adjustment groove portion during flange back adjustment in a camera manufacturing process is stored and the rotary barrel is rotated to bring the cam follower to the stored position in a given glance back adjustment groove portion prior to focusing.

5. A zoom lens barrel comprising first and second lens groups arranged along an optical axis, a first drive means which moves the first lens group in the direction of the optical axis for focusing, a second drive means which moves both the first and second lens groups in the direction of the optical axis for zooming, a rotary barrel which is rotated by the second drive means, a movable barrel disposed inside the rotary barrel in a helicoidal engagement with the rotary barrel to be projectable of forward from the front end of the rotary barrel and retractable into the rotary barrel in the direction of the optical axis in response to rotation of the rotary barrel, the first lens group is held by the movable barrel and forms a front lens group while the second lens group forms a rear lens group disposed rearward of the front lens group, a cam groove formed on the rotary barrel to guide the second lens group in response to rotation of the rotary barrel during zooming, and a cam follower provided on a lens holder of the second lens group and engaged with the cam groove, wherein said cam groove comprises alternately formed zooming groove portions and flange back adjustment groove portions, and flange back adjustment is carried out by rotating the rotary barrel with the cam follower in engagement with one of the flange back adjustment groove portions.

6. A zoom lens barrel as recited in claim 5 wherein the rotary barrel comprises an inner intermediate barrel disposed inside an outer intermediate barrel which is disposed inside a fixed barrel in helicoidal engagement with the fixed barrel, the outer intermediate barrel being moved along the optical axis when rotated by the second drive means, the inner intermediate barrel being in a helicoidal engagement with the outer intermediate barrel and being moved along the optical axis while rotating when torque of the outer intermediate barrel is transmitted thereto.

7. A zoom lens barrel comprising first and second lens groups arranged along an optical axis, a first drive means which moves the first lens group in the direction of the optical axis for focusing, a second drive means which moves both the first and second lens groups in the direction of the optical axis for zooming, a rotary barrel which is rotated by the second drive means, a cam groove formed on the rotary barrel to guide the second lens group in response to rotation of the rotary lens barrel during zooming, and a cam follower provided on a lens holder of the second lens group and engaged with the cam groove, wherein said cam groove comprises alternately formed zooming groove portions and flange back adjustment groove portions, and flange back adjustment is carried out by rotating the rotary barrel with the cam follower in engagement with one of the flange back adjustment groove portions and the position of the cam follower in each flange back adjustment groove portion during a flange back adjustment process is stored and subsequently the rotary barrel is rotated to bring the cam follower to the stored position in a given flange back adjustment groove portion prior to focusing.

* * * * *